United States Patent [19]

Standish, Jr.

[11] Patent Number: 4,850,131

[45] Date of Patent: Jul. 25, 1989

[54] METHOD OF MAKING FISHING LURE

[76] Inventor: Calvin G. Standish, Jr., Rt. 1, P.O. Box 171, Pequot Lakes, Minn. 56472

[21] Appl. No.: 251,778

[22] Filed: Oct. 3, 1988

Related U.S. Application Data

[60] Division of Ser. No. 147,696, Jan. 25, 1988, Pat. No. 4,825,501, which is a continuation-in-part of Ser. No. 612,749, May 21, 1984.

[51] Int. Cl.$^4$ ................ A01K 85/00; B21D 39/00
[52] U.S. Cl. .................... 43/42.53; 29/434; 29/517
[58] Field of Search ............ 43/1, 42.53; 29/434, 29/517

[56] References Cited

U.S. PATENT DOCUMENTS

| | | | |
|---|---|---|---|
| 1,547,619 | 7/1925 | Shannon | 43/42.24 |
| 1,731,161 | 10/1929 | Farley | 43/42.13 |
| 1,787,726 | 1/1931 | Heddon et al. | 43/42.13 |
| 1,830,080 | 11/1931 | Allen | 43/42.11 |
| 1,842,127 | 1/1932 | Stickel et al. | 43/42/12 |
| 2,167,945 | 8/1939 | Gilliam | 43/43.13 |
| 2,374,279 | 4/1945 | Fugler | 43/42.13 |
| 2,526,077 | 10/1950 | Jurczak | 43/42.12 |
| 2,926,451 | 3/1960 | Leba | 43/42.14 |
| 3,093,923 | 6/1963 | Jackson | 43/42.11 |
| 3,112,576 | 12/1963 | Tay | 43/42.14 |
| 3,131,504 | 5/1964 | Haulk | 43/42.53 |
| 3,257,750 | 6/1966 | Shannon | 43/42.06 |
| 3,397,478 | 8/1968 | Lowes, Jr. | 43/42.14 |
| 3,546,804 | 12/1970 | Woolums | 43/42.11 |
| 3,747,256 | 7/1973 | Haddock | 43/42.13 |
| 3,906,619 | 9/1975 | Shaffer | 29/517 |
| 4,033,065 | 7/1977 | Shannon | 43/42.13 |
| 4,037,345 | 7/1977 | Dubois | 43/42.13 |
| 4,074,454 | 2/1978 | Cordell, Jr. | 43/42.28 |
| 4,201,008 | 5/1980 | Sparkman | 43/42.13 |
| 4,447,980 | 5/1984 | Bassett | 43/42.14 |
| 4,450,644 | 5/1984 | Leal | 43/42.2 |
| 4,468,881 | 9/1984 | Gordon, III | 43/42.25 |
| 4,510,710 | 4/1985 | Hanna et al. | 43/42.13 |

*Primary Examiner*—Nicholas P. Godici
*Assistant Examiner*—William Scott Andes
*Attorney, Agent, or Firm*—Burd, Bartz & Gutenkauf

[57] ABSTRACT

A sound producing fishing lure and method of making the lure having an elongated linear body secured at one end to a hook and at the other end to a blade support. The blade support has a pair of upwardly diverging arms attached to longitudinal rods. Blades rotatably supported on the rods have outer portions that intermittently contact each other to produce fish attracting sounds as the lure is retrieved in the water. The arms are bendable relative to each other to change the lateral positions of the blades and thereby alter the sound producing characteristics of the lure. The body and blade support have interengaging side-by-side legs and body members that are clamped together with a stainless steel collar.

19 Claims, 7 Drawing Sheets

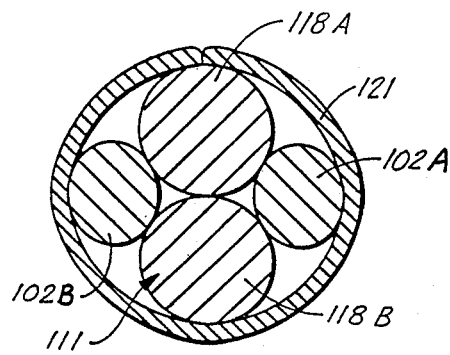
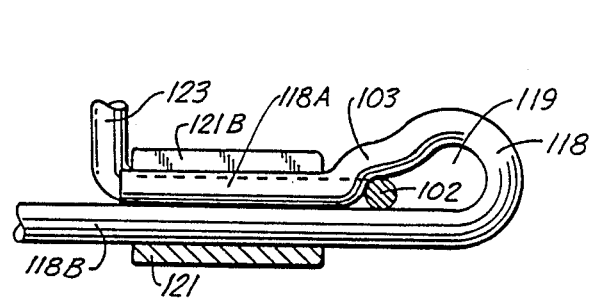
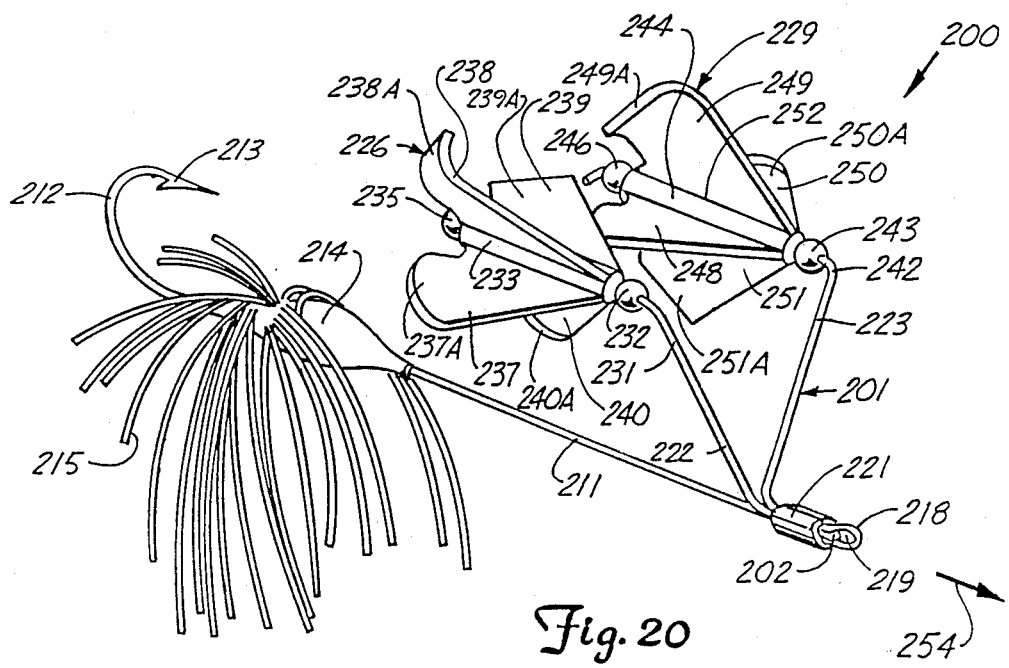

METHOD OF MAKING FISHING LURE

CROSS REFERENCE TO RELATED APPLICATION

This application is a division of application Ser. No. 147,696 filed Jan. 25, 1988, now U.S. Pat. No. 4,823,501. Application Ser. No. 147,696 is a continuation-in-part of U.S. application Ser. No. 612,749 filed May 21, 1984.

FIELD OF INVENTION

The invention is directed to an artificial fishing lure that attracts fish by motion and sound as it is drawn through the water and a method of making a fishing lure.

BACKGROUND OF INVENTION

Fish have a lateral line running along each side of their bodies. Each line is a small canal extended along the length of a side of the fish. The canal is filled with a thick liquid. Numerous pores along the length of the canal are open to the outside in the skin or between the fish scales. Nerve endings joined to the canal are part of the nervous system of the fish. The lateral lines allow the fish to monitor information about its surroundings. The fish senses the changes in current, temperature, pressure and direction of the water flow. The lateral lines also function to monitor balance and operate as a sonar system. As the fish swims, it produces motion that sends out vibrations that are reflected off of objects. The reflected vibrations or signals are picked up by the sensitive lateral lines. The nerve endings sense the signals picked up by the lateral lines and transmit the signals to the nervous and control/command systems of the fish. It has been observed that fish respond to sound by swimming to the source of the sound vibrations.

A fishing lure that utilizes sound to attract fish is described by Lowes, Jr. in U.S. Pat. No. 3,397,478. The Lowes fishing device produces pulse vibrations as it is drawn through the water. These vibrations are produced by a pair of bladed rotatable members mounted on a single shaft. A helical cam interposed between the rotatable members causes forward and reverse movements of one rotatable member to produce intermittent sounds. An audible fishing lure for producing chirping and clicking sounds to attract fish is disclosed by Tay in U.S. Pat. No. 3,112,576. The Tay lure has a pair of oppositely pitched spinners rotatably mounted on a single rigid shaft attached to a fish line. The spinners strike each other during their rotation to produce clicking sounds.

SUMMARY OF INVENTION

The invention relates to a fishing lure and method of making a fishing lure that produces sound signals or vibrations as it is retrieved in the water. The lure has a linear body having a forward eye adapted to accommodate a fish line or leader connected to a conventional fishing tackle. A hook is joined to the rear of the body. A pair of bendable arms are attached to the forward end of the body. The arms extend upwardly and outwardly from the forward end of the body. Rod members joined to the outer ends of the arms extend generally parallel to the body and support rotatable blades. The blades rotate in opposite directions when the lure is pulled in the water. The blades have portions that hit each other on concurrent rotation of the blades which generates fish attracting intermittent sounds. A first weight or head is mounted on the body adjacent the hook. A flexible skirt surrounds the hook adjacent the head means to provide camouflage for the head and hook and fish alluring dressing. The skirt has a plurality of flexible bands surrounding the head and hook. A second weight or nose is a connector that joins to the body and arms adjacent the forward eye. The arms are bendable elongated linear wire members. Each of the arms is selectively bendable toward or away from each other to alter the lateral space relationship between the blades to change the sound generating characteristics of the rotating blades.

Each blade has a generally V-shaped body and oppositely turned ears located on opposite end portions of the body. The ears of the second blade extend in circumferential directions opposite the circumferential direction of extension of the corresponding ears in the first blade whereby the first and second blades rotate in opposite rotational directions as the lure is moved forwardly in the water. The rotating blades contact each other and produce clicking sounds and motion that attracts fish.

The invention includes a method of connecting a blade support to the forward end of the body or main wire. The eye of the body is formed by turning a front portion of the wire upwardly and rearwardly. The front portion of the body has side-by-side body members extended rearwardly from the eye. A fish hook is connected to the rear end of the body. A head, such as a weight, surrounds the rear end of the body and shank of the fish hook to permanently secure the fish hook to the body. The blade support has upwardly directed arms joined at its lower end to a forwardly directed loop. The loop has a pair of side-by-side legs. Rods extended rearwardly generally parallel to the body are connected to the upper ends of the arms. The loop is located in the eye by moving it between the body members. This positions the legs adjacent opposite sides of the body members. The eye has a rearwardly directed recess that receives the forward portion of the loop. This positions the legs and body members in side-by-side and longitudinal locations at the front end of the lure. A connector, such as a split collar, is clamped about the side-by-side legs and body members with a bending or clamping machine equipped with clamping tooling. The machine bends the collar into a generally circular split sleeve to hold the side-by-side legs and body members in a tight fitting relationship with each other. The seam or adjacent end edges of the collar are located on the top of the lure adjacent the back of the eye. The side edges of the clamped collar are rounded to prevent any cutting of the wires or damage to fish line. The collar is preferably made of stainless steel as opposed to lead to eliminate any potential environmental hazard. The blades and bends are slipped onto the rods to rotatably locate the blades on the rods. The trailing ends of the rods are turned inwardly to retain the blades and beads in free rotating assembled relationship on the rods. The blades are located side-by-side above the body so that outer portions of the blades contact each other as the blades rotate. The blades have oppositely turned ears which cause the blades to rotate in opposite directions on their respective rods. A skirt is then mounted on the lure adjacent the head. The head is then decorated with paint and eye designs. Blades may also be painted. The method of connecting the body to the blade support with a clamped collar is efficient as it saves time, labor and costs over other methods, such as soldering, of connecting these parts together.

DESCRIPTION OF DRAWING

FIG. 18 is an enlarged sectional view taken along the line 18—18 of FIG. 17.

FIG. 19 is an enlarged sectional view taken along the line 19—19 of FIG. 17.

FIG. 20 is a perspective view of a second modification of the audible fishing lure of my invention;

DETAILED DESCRIPTION OF EMBODIMENTS OF INVENTION

Figure 1:
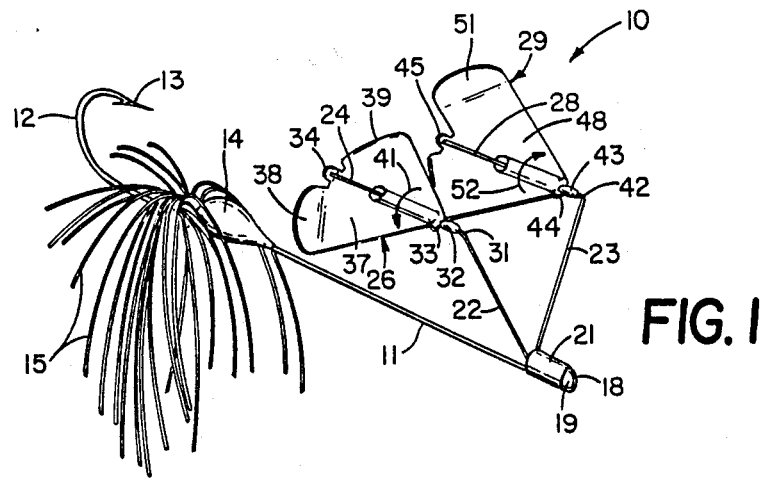
FIG. 1 is a perspective view of an audible fishing lure according to my invention.
Figure 2:
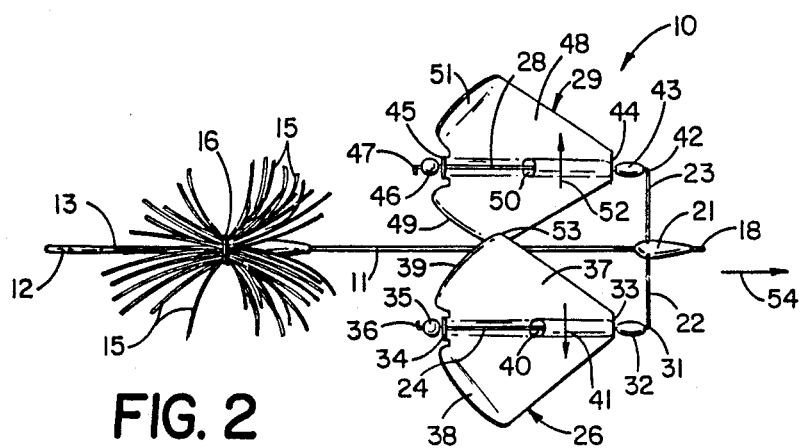
FIG. 2 is a top view of FIG. 1.
Figure 3:
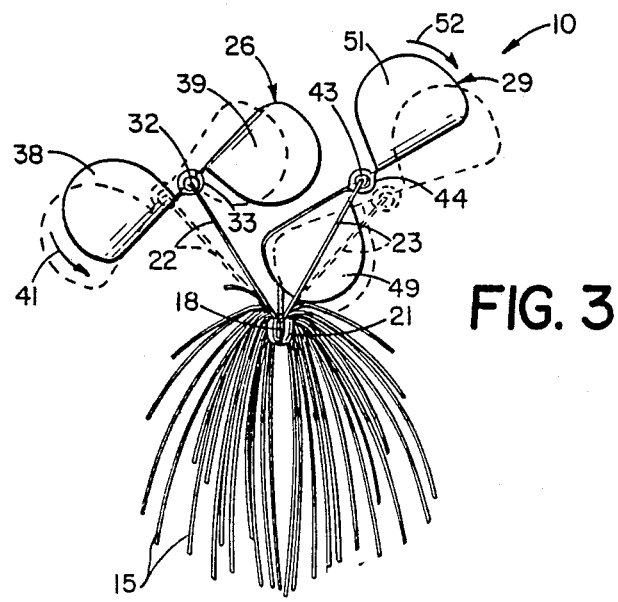
FIG. 3 is a front view of FIG. 1.

Referring to FIGS. 1 to 3, there is shown an audible fishing lure of the invention indicated generally at 10. Lure 10 has an elongated linear body 11 normally extended in a generally horizontal direction. Body 11 is an elongated wire or rod having a rear end attached to a fish hook 12. Hook 12 extends in an upward direction and terminates in a forwardly projected barb 13. Hook 12 is normally located in the vertical plane of body 11. A first sinker or weight 14, known as a head, surrounds the rear of body 11 and the shank of hook 12. Hook 12 is connected to the rear end of body 11. Weight 14 is a molded lead body located around the connection of hook 12 to body 11 so that the weight secures hook 12 to body 11. Weight 14 has a generally conical or teardrop shape which tapers in a rearward direction toward hook 12.

A flexible camouflage skirt 15 is mounted on hook 12 adjacent weight 14 to provide bulk, motion and color that attracts fish. As shown in FIG. 2, a cord, wire, thread, or band 16 wrapped around the mid-portion of skirt 15 retains the skirt on hook 12 adjacent weight 14. Skirt 15 comprises a plurality of flexible members or bands that project from opposite sides of cord 16 to provide camouflage for hook 12 and weight 14. The flexible members can be hair, tinsel, metal foil strips or elongated plastic or rubber bands. The flexible members can have one or more colors, such as red and white, black and white, and the like. Skirt 15 can be replaced with a slip-on skirt 115 shown in FIGS. 5 and 8.

The forward end of body 11 is an upwardly turned loop 18 forming an eye 19. A line or a leader (not shown) can be attached to loop 18 whereby lure 10 is pulled in the forward direction, indicated by arrow 54 in FIG. 2, by conventional fishing tackle. A second weight or nose 21 is a joint or connector mounted on the forward end of body 11 adjacent loop 18. Nose 21 is a generally cone-shaped weight, such as a rigid joint molded on body 11 and upper end of loop 18. Nose 21 can be a solder joint which joins the forward end of body 11 to enclose loop 18 and support a pair of arms 22 and 23. Nose 21 is a connection between body 11 and a blade support member that includes arms 22 and 23. The connection can be a metal clamping collar, a plastic collar, plastic tape, a plurality of C-clamps or an adhesive.

Extended upwardly from nose 21 are a pair of bendable linear arms 22 and 23. The lower ends of arms are embedded in head 21. Arms 22 and 23 are wires extended upwardly in opposite outward directions from nose 21. The angle between arms 22 and 23 is less than 90 degrees. This angle can be changed by bending arms 22 and 23 toward or away from each other. The lower ends of arms 22 and 23 are anchored to nose 21. Head 21 is a rigid connector for arms 22 and 23. Arm 22 has a first linear rod end 24 rotatably supporting a first blade indicated generally at 26. Arm 23 has a second rod end 28 rotatably supporting a second blade indicated generally at 29. Rod ends 24 and 28 are linear wires extended rearwardly generally parallel to each other and parallel to body 11.

The upper end of arm 22 has a right angle corner 31 joined to the forward end of rod 24. A cylindrical bead 32 spaces blade 26 from corner 31. Blade 26 has a pair of end tabs 33 and 34 having holes accommodating rod 24. The rear end of rod 24 supports a bead 35. An inwardly turned right angle finger 36 of rod 24 retains bead 35, blade 26 and bead 32 in rotating relationship on rod 24. Blade 26 has a generally flat V-shaped body 37 comprising generally triangular shaped vanes and a central hole 40. A pair of curved tabs or ears 38 and 39 located on the opposite rear edges of body 37. Body 37 has rearwardly diverging linear side edges. Ears 38 and 39 each have aligned holes for rod 24 and generally U-shaped outer edges that merge with the linear side edges of body 37. Rod 24 extends through hole 40 in body 37 and the holes in tabs 33 and 34 whereby blade 26 is free to rotate on rod 24. Ears 38 and 39 project in the same circumferential direction and cause rotation of blade 26 in a counterclockwise direction as indicated by the arrow 41 when the lure is pulled in the forward direction.

Second arm 23 has an outer right angle corner 42 joined to the forward end of rod 28. A bead 43 mounted on rod 28 spaces blade 29 from corner 42. Blade 29 has a pair of tabs 44 and 45 containing aligned holes for accommodating rod 28. The rear end of rod 28 supports a spherical bead 46. Bead 46 can be replaced with a rivet mounted on the rear end of rod 28. An inwardly turned finger 47 on the end of rod 28 maintains bead 46, blade 29, and bead 43 in rotating assembled relation on rod 28. Blade 29 has a V-shaped body 48 comprising generally triangular vanes and a central hole 50. Blade 29 also has ears 49 and 51 projected in the same circumferential direction. Blade 29 has the same size and shape as blade 26 except that ears 49 and 51 project in opposite circumferential directions from corresponding ears 38 and 39 whereby blade 29 rotates in a clockwise direction as indicated by arrow 52. Rod 28 extends through hole 50 and the holes in tabs 44 and 45 whereby blade 29 is free to rotate on rod 28. Blades 26 and 29 are located above body 11 between weights 14 and 21 and provide the lure with horizontal and lateral balance in the water.

An example of lure 10 has the following dimensions. The body 11 is a linear stiff wire having a length of 6 cm. Weight 14, such as ¼, ⅛ or ½ ounce lead weight, surrounds the rear end of the wire and adjacent end of the shank of fish hook 12. Hook 12 is turned upwardly with the barb projected in the forward direction. Body 11 and hook 12 are located in the same vertical plane direction. Skirt 15 comprises a plurality of flexible strings having a length of 8 cm. The strings are disposed around weight 14 and retained on the hook shank with a thread 16. Arms 22 and 23 are linear bendable wires that project upwardly. The angle between arms 22 and 23 is less than 90 degrees. Each arm has a length of 3 cm. Each rod 24 and 28 has a length of 4 cm and extends rearwardly generally parallel to body 11. Beads 32 and 43 rotatably mounted on rods 24 and 28 have elongated general oval shapes and length of 5 mm. Blades 26 and 29 are one-piece sheet metal members rotatably mounted on rods 24 and 28. Blades 26 and 29 can be made of sheet aluminum. An example of a suitable rotatable blade is disclosed by Sparkman in U.S. Pat. No. 4,201,008.

In use, blades 26 and 29 rotate in opposite directions as indicated by arrows 41 and 52 as the lure is retrieved in a forward direction as indicated by arrow 54. This causes the lure to move along the line of pull in the water at or near the surface of the water. The rotating blades 26 and 29 intermittently contact or hit each other thereby produce sounds and motion. Outer portions 53 of blades 26 and 29, as shown in FIG. 2, hit each other and thereby produce sounds or vibrations. The vibrations are transmitted through the water. Fish in the vicinity of lure will sense the sound vibrations and make an inquisitive investigation.

The sound producing characteristics of lure 10 can be altered by the fisherman. As shown in FIG. 3, arms 22 and 23 can be bent in opposite outward directions as indicated by the broken lines. This laterally spaces blades 26 and 29 from each other so only outer edges of the ears 38, 39, and 49, 51 will intermittently engage each other as the blades 26 and 29 rotate in opposite directions as indicated by arrows 41 and 52. This changes the sound vibration intensity and sound frequency of lure 10 as it is drawn through the water. The fisherman, with the use of intermittent retrieval can further alter the sound generating characteristics of the lure to attract fish. Alterations in the retrieval speed of lure 10 also causes changes in the sound signals caused by the rotating blades 26 and 29.

As shown in FIG. 1, blade 26 and 29 are located above the body 11 between weights 14 and 21. Rod members 24 and 28 are shorter than body 11 which locates the rear or terminal ends of the blades 26 and 29 in front of hook 12 and rear weight 14. Fish attracting skirt 15 does not interfere with the rotation of blades 26 and 29. The location of blades 26 and 29 in front of hook 12 helps avoid missing strikes and shorter hits of fish attacking lure 10. The counter rotation of blades 26 and 29 maintains the lure running straight without yawing or rolling from side to side. By retrieving the lure immediately or having lure control at touchdown, it is possible to keep lure 10 on or near the surface of the water after entering the water. At times, blades 26 and 29 may break the surface of the water during retrieval creating a splashing and gurgling sound. When the retrieve is stopped, lure 10 will sink, i.e., move straight down as blades 26 and 29 slowly rotate. Weights 14 and 21 along with the blades 26 and 29 horizontally and laterally balance the lure in the water. Many times fish will hit lure 10 when the retrieve is started up again. The linear body wire 11 along with the teardrop shape of weight 14 and upwardly located hook 12 allows lure 10 to be worked over lillypads, logs, or brush and through reeds and bulrushes without getting regularly hung-up.

Figure 4:
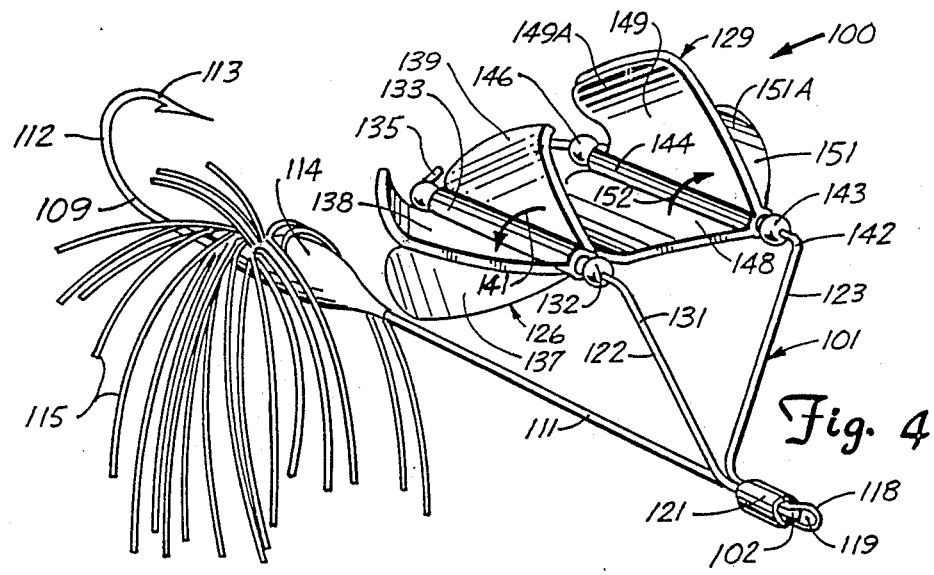
FIG. 4 is a perspective view of a first modification of the audible fishing lure of my invention.
Figure 5:
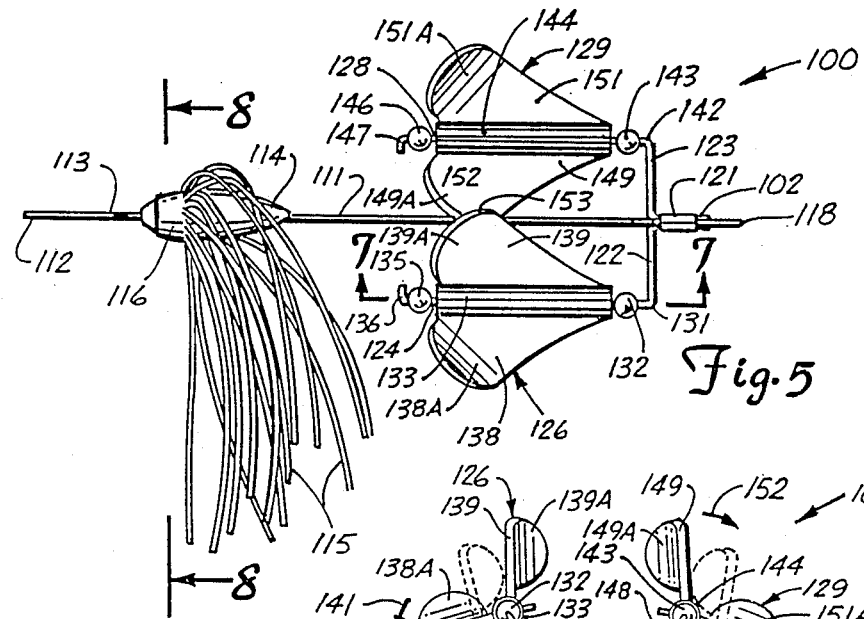
FIG. 5 is a top view of FIG. 4.
Figure 6:
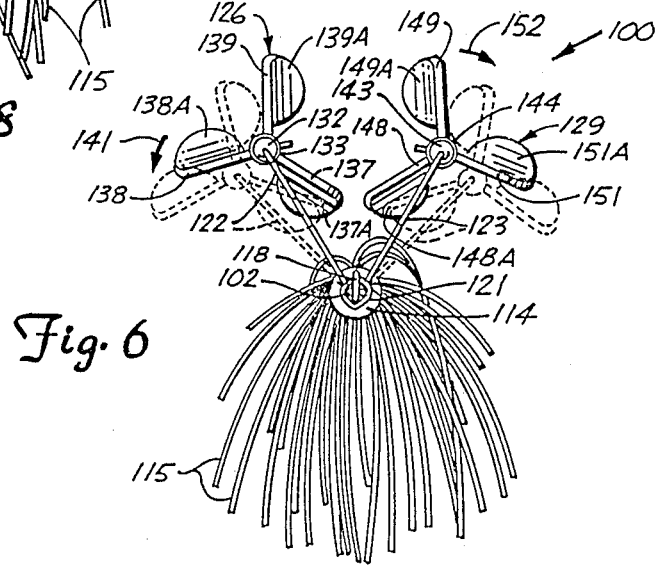
FIG. 6 is a front view of FIG. 4.

Referring to FIGS. 4 to 6, there is shown a modification of audible fishing lure indicated generally at 100. Lure 100 has an elongated linear body 111 normally extended in a generally horizontal direction. Body 111 is an elongated body wire or rod having a rear end attached to a fish hook 112. Hook 112 is a conventional fish hook that extends in an upward direction and terminates in a forwardly projected barb 113. Hook 112 is normally located in the vertical plane of body 111 with barb 113 located above and behind a head or weight 114. Weight 114 surrounds the rear of body 111 and the front end of shank 109 of hook 112. Hook 112 is fixed to the rear end of body 111 and retained therewith with weight 114. Weight 114 is a molded lead body that encapsulates the connection between hook 112 and the rear end of body 111. Weight 114 can alternatively be a stainless steel body, or a member made from non-toxic material to reduce potential environmental hazard. Weight 114 has a generally conical or teardrop shape which tapers inwardly in a forward direction away from hook 112.

Figure 8:
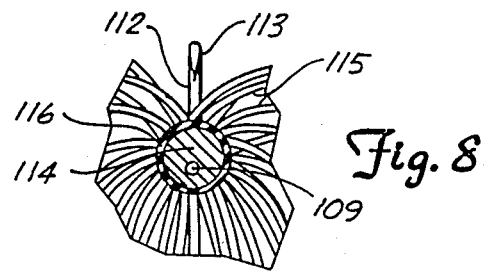
FIG. 8 is an enlarged sectional view taken along the lines 8—8 of FIG. 5.

A flexible skirt 115 is mounted on the rear of weight 114 to camouflage the hook and provide lure action that attracts fish. As shown in FIG. 5 and 8, skirt 115 has an elastic band or sleeve 116 to retain the skirt on weight 114. Skirt 115 includes a plurality of flexible members or stringers that project from the forward end of band 116 to provide visual and motion camouflage for hook 112 and weight 114. The flexible members can be hair, tinsel or elongated plastic or rubber bands having a length sufficient to extend beyond the rear end of hook 112. Skirt 115 along with the flexible members can have one or more colors such as red and white, translucence with gold or silver specks, red or brown, black or white, and the like. Band 116 is an elastic sleeve that is expanded over the rear end of weight 114 as shown in FIG. 8 to frictionally retain the skirt on the weight 114. The shank 109 of the hook is embedded in the material of weight 114 to provide a permanent connection between body 111 and hook shank 109.

Figure 9:
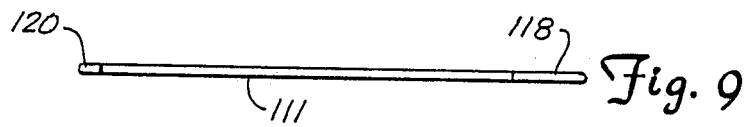
FIG. 9 is a top view of the body wire of the fishing lure of FIG. 4.
Figure 10:
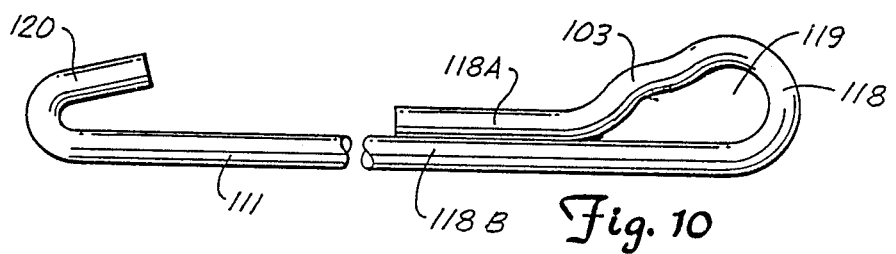
FIG. 10 is an enlarged foreshortened side view of the body wire of FIG. 9.

Referring to FIGS. 9 and 10, the rear end of body 111 has an upwardly and forwardly turned loop 120 that accommodates the eye (not shown) of hook 112 to provide a connection between the hook 112 and body 111. Weight 114 is molded about this connection. The forward end of body 111 has an upwardly and rearwardly turned loop 118 forming a front eye 119. A fish line or leader (not shown) is normally attached to loop 118 to allow the lure to be pulled in a forward direction by conventional fishing tackle.

A blade support, indicated generally at 101 in FIGS. 4, 11, 12, and 14 to 17, is connected to the forward end of body 111 with a rigid connector 121. Connector 121 is a nose that functions to clamp and secure body 111 and blade support 101 together as described herein.

Figure 7:
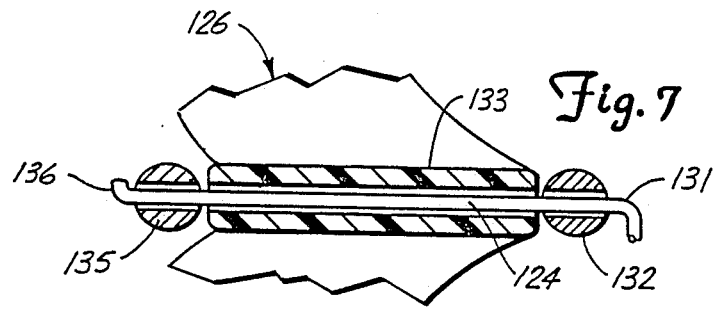
FIG. 7 is an enlarged sectional view taken along the line 7—7 of FIG. 5.

Blade support 101 has a pair of bendable linear arms 122 and 123 connected to a forwardly extended loop 102. Loop 102 extends in a generally horizontal direction and is normally disposed relative to the arms 122 and 123. Arms 122 and 123 are wires extended upwardly in opposite directions from loop 102. The angle between arms 122 and 123 is preferably less than 90 degrees. This angle can be changed by bending the arms 122 and 123 relative to each other. Arm 122 has a linear rod 124 supporting a rotatable first blade indicated generally at 126. Arm 123 has a second rod 128 supporting a rotatable second blade indicated generally at 129. Rods 124 and 128 are linear wires extended generally parallel to each other and parallel to body 111. The upper end of arm 122 has a right angle corner 131 joined to the forward end of rod 124. As shown in FIG. 7, a spherical bead 132 spaces the front of blade 126 from corner 131. Blade 126 has a centrally located tube 133 having a longitudinal passage for accommodating rod 124 so that blade 126 is free to rotate on rod 124. Tube 133 has a smooth cylindrical inside surface forming the passage for rod 124. The diameter of the passage is larger than the diameter of rod 124 so that the blade is free to rotate on rod 124 about an axis that is generally parallel to the length of body 111. The rear end of rod 124 accommodates a bead 135. An inwardly directed right angle finger 136 on rod 124 retains bead 135 and blade 126 in free rotating relationship on rod 124.

Returning to FIGS. 4 to 6, blade 126 has three generally flat triangular-shaped vanes 137, 138, and 139 attached to tube 133. Vanes 137, 138, and 139 are circumferentially spaced from each other on tube 133 and have rearwardly diverging linear sides. The rear portions of vanes 137, 138, and 139 have curved ears 137A, 138A, and 139A. Each ear has a generally U-shape or semi-circular outer edge that merges with the linear side edge of the corresponding vane. Ears 137A, 138A, and 139A are curved in the same circumferential direction and cause rotation of blade 126 in a counterclockwise direction as indicated by arrow 141 when lure 100 is moved in the forward direction in the water.

A second arm 123 has an outer right angle corner 142 joined to the forward end of rod 128. A bead 143 mounted on rod 128 spaces the front of blade 129 from corner 142. Blade 129 has a centrally located tube 144 for accommodating rod 128 to allow the blade to freely rotate on rod 128. The rear end of rod 128 supports a spherical bead 146 which spaces the blade from an inward turned finger 147 on the end of rod 128. Finger 147 maintains bead 146 and blade 129 in free rotating assembled relation on rod 128. Blade 129 has three generally flat triangular-shaped vanes 148, 149, and 151 connected to and circumferentially arranged around tube 144. The vanes 148, 149, and 151 have rear portions or ears 148A, 149A, and 151A curved in the same circumferential direction to cause the blade to rotate in a clockwise direction as indicated by arrow 152 in FIG. 4 when the lure is retrieved in a forward direction in the water. Blade 129 is of the same size and shape as blades 126 except that ears 148A, 149A, and 151A are projected in opposite circumferential direction from corresponding ears 137A, 138A, and 139A of blade 126 so that blades 126 and 129 rotate concurrently in opposite directions about separate axes that extend generally parallel to the body 111 as the lure is retrieved in a forward direction in the water.

Blades 126 and 129 are located above body 111 and between the weight 114 and the connector 121. The rear terminal ends of blades 126 and 129 are located in front of hook 112 and forwardly of the skirt 115 so that the skirt does not interfere with the counter-rotation of blades 126 and 129. The concurrent counter-rotation of blades 126 and 129 causes intermittent sounds as the outer portions of the blades strike each other. The sound producing characteristics of lure 100 can be altered by the fisherman by changing the lateral distance between the blades 126 and 129 by bending the arms 122 and 123. A change in the materials of the blades from metal to plastic, ceramic, or the like will also change the sound producing characteristics of the lure as it is drawn through the water. The location of blades 126 and 129 in front of hook 112 helps avoid missing strikes and short hits of fish attacking lure 100. The counter-rotation of blades 126 and 129 will maintain the lure running straight without rolling from side to side and helps keep the lure at or near the surface of the water during a retrieve. When the retrieve is stopped, lure 100 will sink straight down into the water as the blades slowly rotate in opposite directions which maintains the balance of the lure in the water. The linear body 111 and teardrop shape of weight 114 along with the upwardly curved hook 112 allows the lure 100 to be worked over lillypads, logs, and through reeds and bulrushes without getting tangled or caught.

Referring to FIGS. 9 to 19, there is shown the structure and method of making lure 100. FIGS. 9 and 10 show the shape of the body 111 that is initially made with wire bending tools. The body 111 has an upwardly turned loop 120 at its rear end adapted to be connected to the eye of the conventional fish hook such as fish hook 112. The forward end of body 111 has an upwardly and rearwardly turned loop 118 forming an eye 119. The loop 118 has rearwardly directed side-by-side linear body members or portions 118A and 118B. Linear body member 118A has a small upwardly turned indent or curved portion 103 providing a rearwardly extended recess.

Figure 11:
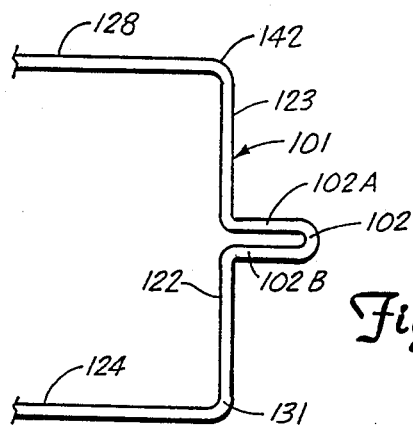
FIG. 11 is a top view of the blade wire of the fishing lure of FIG. 4.
Figure 12:
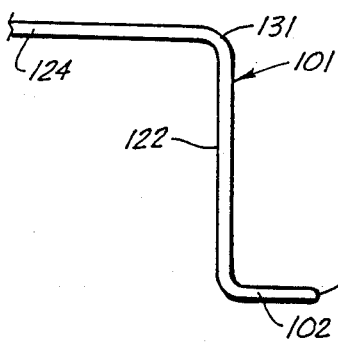
FIG. 12 is a side view of FIG. 11.

Blade support 101, shown in FIGS. 11 and 12, has a forward directed lower loop 102 with linear legs or side portions 102A and 102B. The lateral space between the legs 102A and 102B is less than the diameter of body 111 as shown in FIG. 18. The upwardly diverging arms 122 and 123 are joined to the ends of legs 102A and 102B and are at a 90 degree angle relative to loop 102. Rods 124 and 128 are joined to the upper ends of arms 122 and 123 respectively. Rods 124 and 128 extend generally parallel to body 111 and have a longitudinal length about one half the length of body 111. The entire blade support 101 is made from a single piece of wire that is cold formed into the shape as shown in FIGS. 11 and 12 with wire forming tools.

Figure 13:
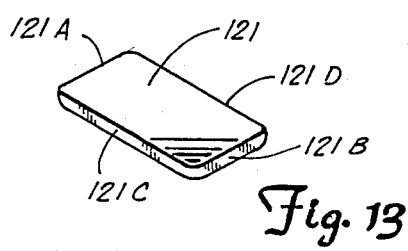
FIG. 13 is a perspective view of the band for securing the body wire and blade wires together.
Figure 14:
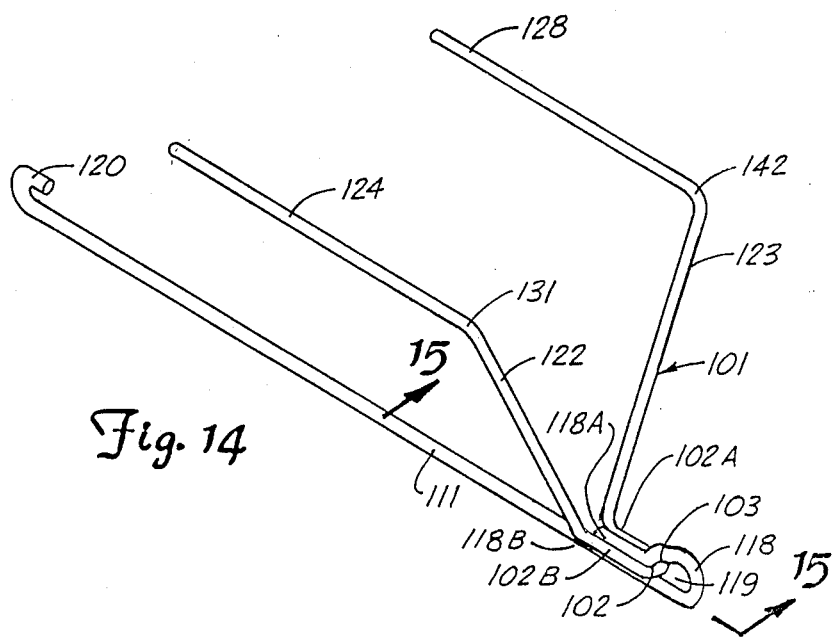
FIG. 14 is a perspective view of the body and blade wires assembled together.
Figure 15:
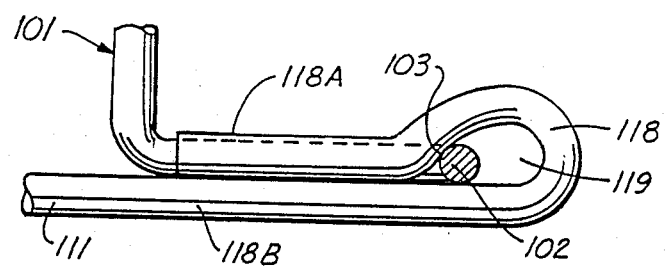
FIG. 15 is an enlarged sectional view taken along the line 15—15 of FIG. 14.

The split sleeve or collar 121, shown in FIG. 13, is initially a flat generally rectangular blank having rounded side and end edges 121A–D. The blank is a short strip of stainless steel. Other non-corrosive and environmentally compatable materials can be used for collar 121. Collar 121 is a connector that holds loop 102 in fixed relation relative to body 111. The connector can be a plurality of metal bands, a metal sleeve, plastic sleeve, C-clips, solder, plastic tape or adhesive or bonding materials.

Body 111 and blade support 101 are interconnected by locating loop 102 in eye 119. The forward portion of loop 102 is located in the recess of indent 103. Loop 102 is placed between body members 118A and 118B so that the legs 102A and 102B straddle the body members 118A and 118B to form a side-by-side linear arrangement of legs 102A and 102B and body members 118A and 118B as shown in cross-section in FIG. 18. The forward end of loop 102 can be moved between body members 118A and 118B. Alternatively, a rod member and arm can be moved through eye 119 and legs 102A and 102B moved adjacent opposite sides of body members 118A and 118B.

Figure 16:
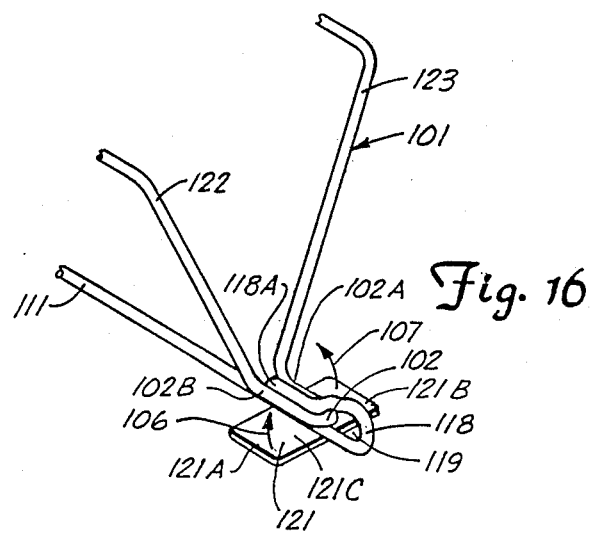
FIG. 16 is a perspective view showing the clamping of the band about the portions of the body and blade wires.
Figure 17:
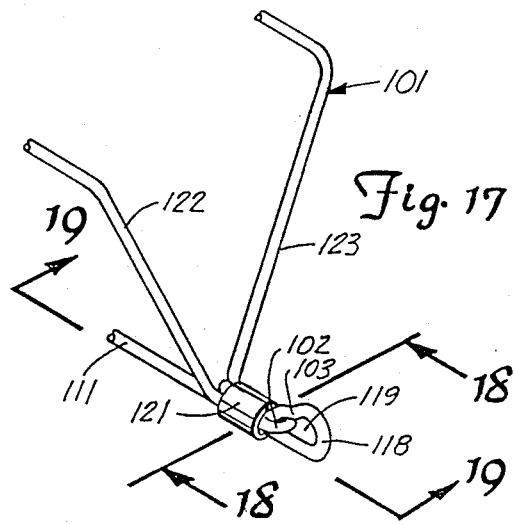
FIG. 17 is a perspective view of the body and blade wires clamped together with the band.

As shown in FIG. 16, the flat blank of collar 121 is located under the interlocked portions of body 111 and blade support 101. A clamp tooling in association with a bending machine (not shown) is used to fold collar 121 upwardlly into a circular configuration or sleeve as shown in FIG. 17 about the interengaged legs 102A and 102B and body members 118A and 118B. The adjacent end edges of collar 121 are located in engagement with each other adjacent the top of body member 118A. As shown in FIG. 18, collar 121 holds legs 102A and 102B in tight compressed relation with respect to the body members 118A and 118B. The compressive force of collar 121 about the legs 102A and 102B slightly deform the legs so they are in tight linear surface contact with opposite linear portions of body members 118A and 118B. Collar 121 also holds body members 118A and 118B in compressive contact with each other. As shown in FIG. 19, body member 118A extends rearwardly beyond arm 123 so that the entire length of legs 102A and 102B are in side surface engagement with body members 118A and 118B forming a secure and stable transverse as well as linear connection between body 111 and blade support 101. Other types of connectors, such as plastic tape, plastic sleeve, adhesive and bonding materials can be used to secure legs 102A and 102B to body members 118A and 118B. The use of a clamping collar to connect the body to the blade support is reliable and efficient as it saves time, labor, and cost over other methods, such as soldering and welding, of connecting the body to the blade support.

Hook 112 can then be hooked onto the open hook 120 of body 111. Weight 114 is then molded about the rear end of body 111 and its hook 120 secured to the eye of the fish hook. Hook 112 and body 114 can be secured to body 111 prior to the interconnection and clamping of the loop of blade support to the forward end of body 111.

The front beads 132 and 143 are then placed on rods 124 and 128. Blades 126 and 129 are moved onto rods 124 and 128. The rods 124 and 128 extend through the longitudinal passages in tubes 133 and 144 of blades 126 and 129. Beads 135 and 136 are then slipped onto rods 124 and 128. The ends 136 and 147 of rods 124 and 126 are then bent inwardly to retain blades 126 and 127 in free rotatable assembled relation on rods 124 and 128.

Weight 114 is then painted and decorated with suitable fish eyes. Blades 126 and 129 can also be painted with a suitable color such as red, yellow, fushia, orange, black, and the like. Skirt 115 is then slipped over the hook and mounted on the rear end of weight 114. Band 116 of the skirt is stretched over the weight 114 and retained thereon with a contractive elastic force. The skirt can be a plurality of bands, strings, hair, or tinsel that are tied with thread onto the forward end of the shank of the hook in a manner as shown in FIG. 2.

Figure 21:
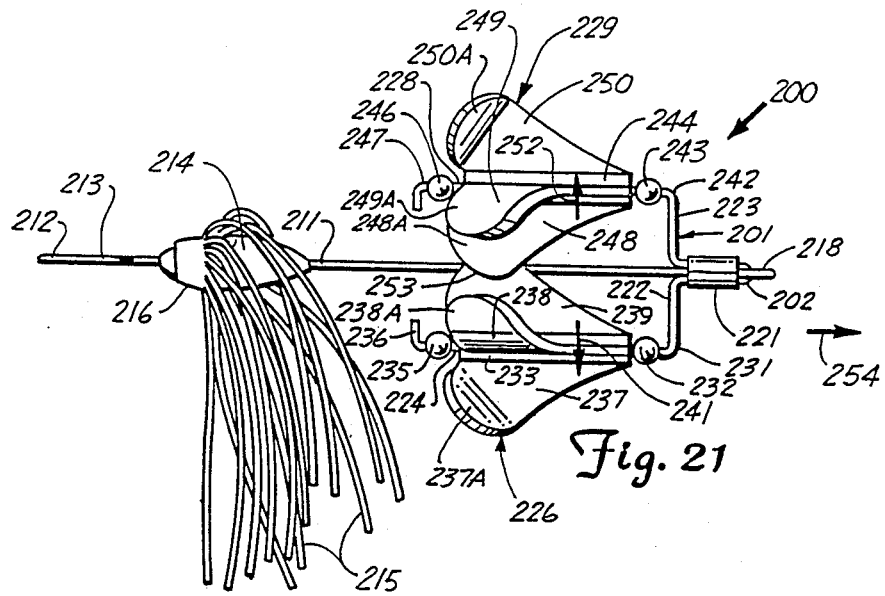
FIG. 21 is a top view of FIG. 20.
Figure 22:
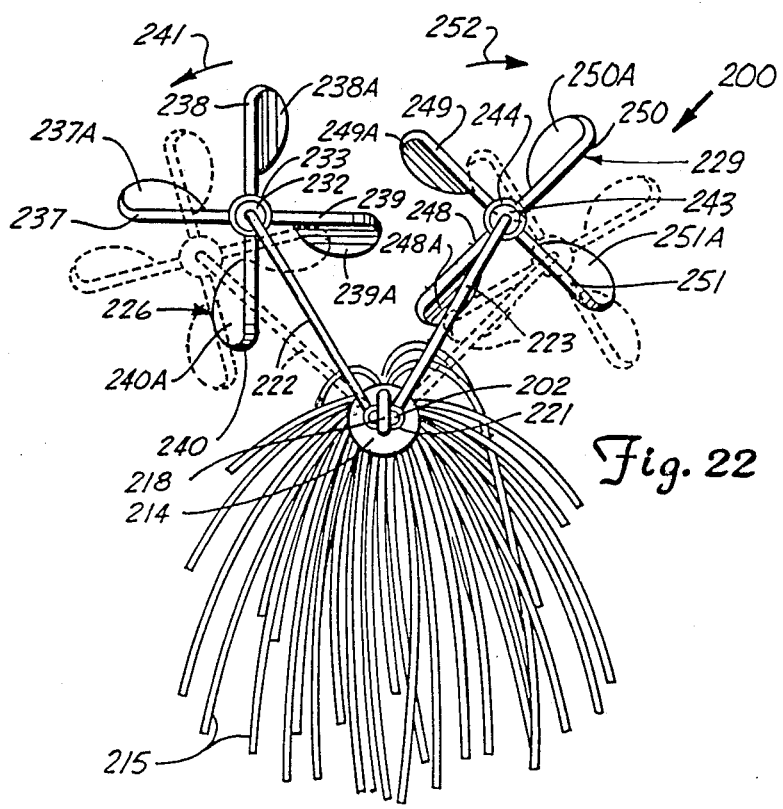
FIG. 22 is an enlarged front view of FIG. 20.

Referring to FIGS. 20 to 22, there is shown a second modification of the audible fishing lure of my invention indicated generally at 200. Lure 200 has a construction substantially similar to lure 100 with counter-rotating blades 226 and 229 having four circumferentially spaced vanes as herein described. Lure 200 has a linear wire body 211 having a rear end attached to a conventional fish hook 212. Hook 212 terminates in a forwardly projected barb 213 that is located above body 111. A weight or head 214, such as a lead body, surrounds the rear end of body 211 and the shank of the hook to permanently connect hook 212 to body 211. Weight 214 has a generally rearwardly directed cone or tear shape.

A skirt 215 is mounted on weight 214 adjacent hook 212 to camouflage the hook and provide fish attracting dressing. Skirt 215 includes a plurality of flexible bands 216 that are joined to a circular elastic sleeve or band surrounding the rear end of weight 214. Skirt 215 produces camouflage and motion adjacent hook 211 and weight 214. Skirt 215 can be colored, such as red, yellow, brown, black, white or the like.

The forward end of body 211 has a loop 218 forming a closed eye 219. A line or leader (not shown) of conventional fishing tackle is normally attached to loop 211 so that the lure can be pulled or retrieved in a forward direction in the water. A blade support indicated generally at 201 is interconnected to the forward end of body 211 with a clamping collar 221 in accordance with the clamping process shown and described in FIGS. 9 to 19.

Blade support 201 is a wire having a forwardly extended U-shaped loop 202 that is located through eye 219. The rear portions or legs of loop 202 are located in side-by-side positions with respect to the body members that form loop 218. The circular sleeve or collar 221 is clamped about the parallel legs and body members to firmly hold body 211 and blade support 201 in fixed relationship relative to each other. Collar 221 is initially a flat metal band, preferably made of stainless steel, that is clamped around the parallel side-by-side legs and body members. The adjacent end edges of collar 221 are located on the top surface of loop 218 adjacent the back of eye 219. The forward and rear edges of collar 221 are rounded to prevent cutting of body 211 and the blade support 201 or damage to the fish line.

Blade support 201 has a pair of bendable arms 222 and 223 connected to loop 202. Arms 222 and 223 extend upwardly in opposite outward directions from loop 202 with the angle between the arms preferably less than 90 degrees. As indicated by the dotted lines in FIG. 22, this angle can be changed by bending arms 222 and 223 toward or away from each other and thereby change the sound producing characteristics of the lure. Arms 222 and 223 have linear rods 224 and 228 that rotatably support a pair of blades indicated generally at 226 and 229. The rod 224 and 228 project generally parallel to each other and are parallel to the longitudinal extent of body 211.

The upper end of arm 222 has a right angle corner 231 joined to the forward end of rod 224. A spherical bead 232 spaces blade 226 in corner 231. Blade 226 has a central elongated tube 233 that accommodates the rod 224 thereby permitting free rotation of blade 226 on the rod. The rear end of rod 224 supports a second bead 235 and spaces the blade from an inwardly directed right angle finger 236 of rod 224. Finger 236 holds blade 226 in free rotating relationship on rod 224.

Blade 226 has four generally flat triangular-shaped vanes 237, 238, 239 and 240 attached to a central longitudinal tube 233. The number of vanes on blade 226 can vary. The vanes 237-240 are circumferentially spaced and project outwardly from the sides of tube 233. Tube 233 has a longitudinal smooth passage that accommodates the rod 224. The vanes 237-240 have rearwardly diverging linear side edges that are joined to curved ears 237A, 238A, 239A, and 240A. The ears each have a generally U-shaped outer edge and are curved in the same circumferential direction to rotate the blade 236 in a counterclockwise manner as indicated by arrow 241 in FIG. 22 when the lure 200 is retrieved in a forward direction in the water.

Second arm 223 has an outer right angle corner 242 joined to a forward end of rod 228. A first bead 243 spaces blade 229 from corner 242 and a second bead 246 spaces the blade from the right angled turned end 247. End 247 is a short finger that holds blade 249 in free rotating assembled relation on rod 228.

Blade 229 has four generally flat triangular vanes 248, 249, 250, and 251 connected to a central longitudinal tube 244. The tube 244 has a longitudinal passage that accommodates rod 228 to provide free rotational movement of blade 229 as the lure is retrieved through the water. Vanes 248, 249, 250, and 251 have rear ends or ears 248A, 249A, 250A, and 251A that are extended in the same circumferentially direction which is opposite the direction of extension of the ears 237A, 238A, 239A, and 240A of blade 226 whereby blade 229 rotates in a clockwise direction as indicated by arrow 252 and blade 226 rotates in a counterclockwise direction as indicated by the arrow 241 as the lure 200 is retrieved in a forward direction in the water, indicated by arrow 254. During rotation of blades 226 and 229, the outer portions 253 of the blades 226 and 229, as shown in FIG. 21, intermittently contact or hit each other, thereby produce fish attracting sound and motion. The sound producing characteristics of lure 200 can be altered by changing the lateral space between blade 226 and 229 by bending the wires 222 and 223 or by altering the pattern of retrieval of lure 200.

Blades 226 and 229 can be made of metal such as aluminum or plastic, ceramic and like materials. Also, the blades 226 and 229 can be replaced with blades having two vanes, such as blades 26 and 29 shown in FIGS. 1 to 3.

While there is shown and described preferred embodiments of the audible fishing lure and method of making the lure, it is understood that changes in the structure and parts as well as the method may be made by those skilled in the art without departing from the invention. The invention is set forth in the following claims.

The embodiments of the invention in which an exclusive property or privilege is claimed are defined as follows:

1. A method of making a flashing lure including a body having a forward end and a rear end, said forward end having an eye and generally parallel side-by-side body members extended rearwardly from the eye, a fish hook having a shank and barb, blade support means having a forwardly directed loop and side-by-side legs, and rotatable blade means comprising: connecting the fish hook to the rear end of the body with the barb located above the body, interconnecting the blade support means with the body by locating the loop through the eye and positioning the legs adjacent opposite sides of the body members whereby the legs and body portions are generally parallel to each other, holding the legs and body members in tight engagement with each other with a holding structure, and rotatably mounting the blade means on said blade support means.

2. The method of claim 1 wherein: the holding of the legs and body members comprises clamping the legs and body members together with a clamp located around said legs and body members.

3. The method of claim 1 wherein: said blade support means has a pair of upwardly directed arms connected to the legs and a rod joined to the upper end of each arm, each rod extended rearwardly generally parallel to said body including rotatably mounting a first blade means on one rod and rotatably mounting a second blade means on the other rod, and laterally spacing said rods whereby on rotation of the first and second blade means the first and second blade means contact each other and produce sounds.

4. The method of claim 1 including: molding a weight about the rear end of the body and shank of the fish hook.

5. The method of claim 1 wherein: at least one of said body members has a recess adjacent open to the eye, and locating said loop in said recess when the legs are adjacent opposite sides of the body members.

6. The method of claim 5 wherein: the holding of the legs and body members comprises clamping the legs and body members together and retaining the loop in the recess with a clamp located around said legs and body members.

7. The method of claim 1 wherein: said fishing lure has a skirt having a plurality of flexible bands, and including molding a weight about the rear end of the body and shank of the fish hook, and mounting the skirt on said weight.

8. A method of constructing an audible fishing lure having a body, having a first and a second end, fish hook means having a shank connected to the first end of the body, blade support means having a pair of horizontal members, and blade means rotatably mounted on the horizontal members, the blade means having portions that contact each other on rotation of the blade means thereby producing intermittent sounds comprising: bending the second end of the body upwardly and rearwardly to form an eye having a rearwardly directed indent and side-by-side body members, bending the horizontal members downwardly and then forwardly into a loop having side-by-side legs, positioning the loop into the eye and locating a forward portion of the loop adjacent the indent, locating the legs adjacent opposite sides of the body member whereby the legs and body members are in side-by-side longitudinal relation, and clamping a band around the legs and body members to hold the body and the blade support means in a tight relationship with each other, and rotatably mounting the blade means on said horizontal members.

9. The method of claim 8 including: molding a weight about the rear end of the body and shank of the fish hook.

10. The method of claim 8 including: said fishing lure has a skirt having a plurality of flexible bands, and including molding a weight about the rear end of the body and shank of the fish hook, and mounting the skirt on said weight.

11. A method of making a fishing lure including a body having a forward end and a rear end, said forward end having an eye and generally parallel side-by-side body members extended rearwardly from the eye, a fish hook having a shank and barb, a blade support means having a forwardly directed loop and side-by-side legs, and rotatable blades comprising: connecting the fish hook to the body, interconnecting the blade support means with the body by locating the loop through the eye and positioning the legs adjacent opposite sides of the body members whereby the legs and body members are positioned side-by-side and generally parallel to each other, clamping the side-by-side legs and body members in tight engagement with each other with a split sleeve, and rotatably mounting the blades on said blade support means.

12. The method of claim 11 including: molding a weight about the rear end of the body and shank of the fish hook.

13. The method of claim 11 wherein: at least one body member has a recess open to the eye, and locating said loop in said recess when the legs are adjacent opposite sides of the body members.

14. The method of claim 11 wherein: said blade support means has a pair of upwardly directed arms connected to the legs and a rod joined to the upper end of each arm, each rod extended rearwardly generally parallel to said body including rotatably mounting a first blade on one rod and rotatably mounting a second blade on the other rod, and laterally spacing said rods whereby on rotation of the first and second blades, the first and second blades contact each other and produce sounds.

15. The method of claim 11 wherein: said fishing lure has a skirt having a plurality of flexible bands, and including molding a weight about the rear end of the body and shank of the fish hook, and mounting the skirt on said weight.

16. A method of making a fishing lure including a body having a forward end and a rear end, said forward end having an eye and forward body means extended rearwardly from the eye, a fish hook having a shank and barb, a blade support means having forwardly directed leg means and rotatable blade means comprising: connecting the fish hook to the rear end of the body, interconnecting the blade support means with the body by positioning the leg means adjacent the body means whereby the leg means and body means are positioned side-by-side and generally parallel to each other, clamping the side-by-side leg means and body means in tight engagement with each other with a sleeve, and rotatably mounting the blade means on said blade support means.

17. The method of claim 16 including: molding a weight about the rear end of the body and shank of the fish hook.

18. The method of claim 16 wherein: said blade support means has a pair of upwardly directed arms connected to the leg means and a rod joined to the upper end of each arm, each rod extended rearwardly generally parallel to said body including: rotatably mounting a first blade on one rod and rotatably mounting a second blade on the other rod, and laterally spacing said rods whereby on rotation of the first and second blades, the first and second blades contact each other and produce sounds.

19. The method of claim 16 wherein: said fishing lure has a skirt having a plurality of flexible bands, and including molding a weight about the rear end of the body and shank of the fish hook, and mounting the skirt on said weight.

* * * * *